June 9, 1959
G. B. BRINGMANN
2,889,634
EDUCATIONAL GAME BOARD WITH SENSING PROBE
Filed Aug. 1, 1958
2 Sheets-Sheet 1
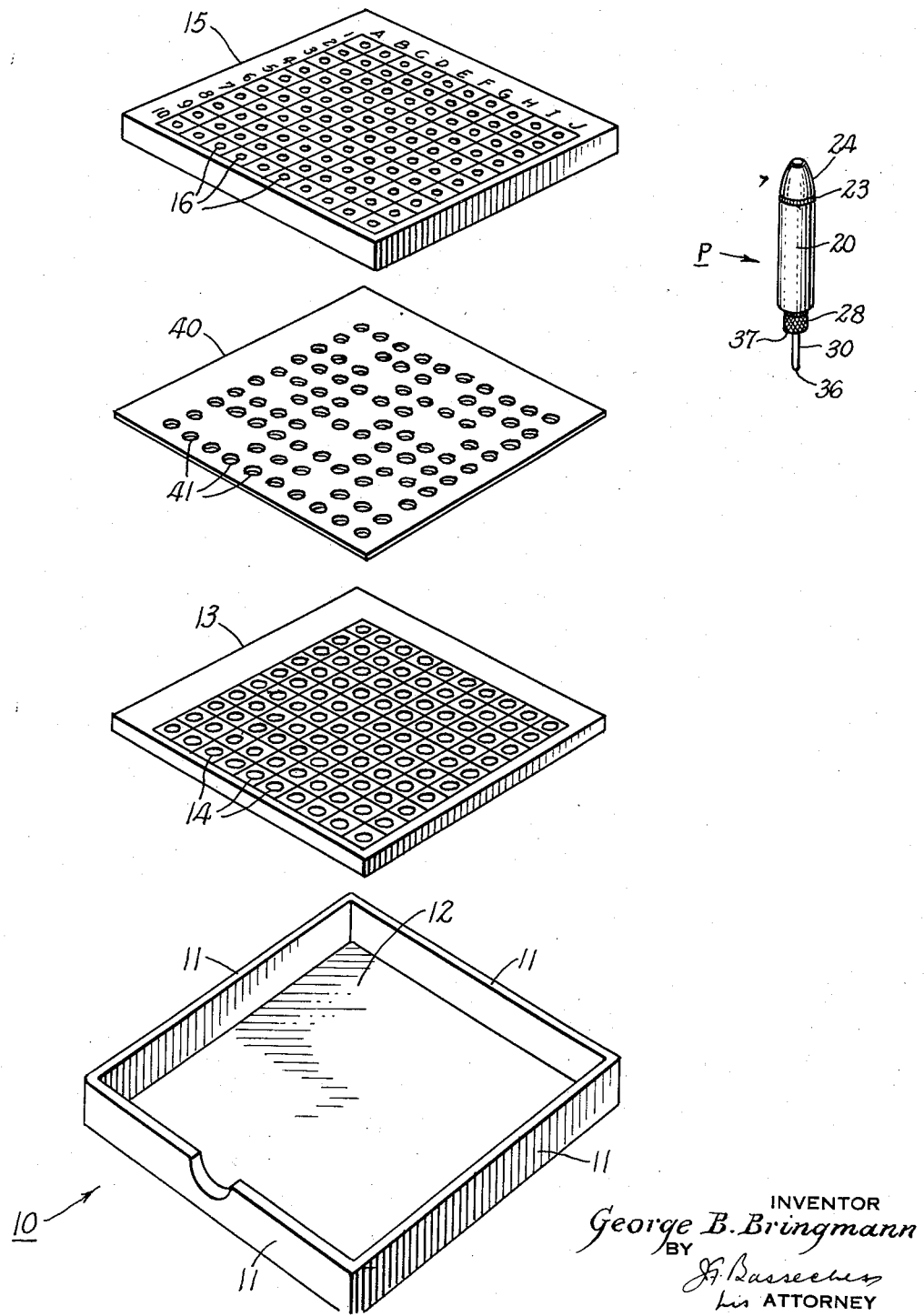
INVENTOR
George B. Bringmann
BY
his ATTORNEY June 9, 1959 G. B. BRINGMANN 2,889,634
EDUCATIONAL GAME BOARD WITH SENSING PROBE
Filed Aug. 1, 1958 2 Sheets-Sheet 2
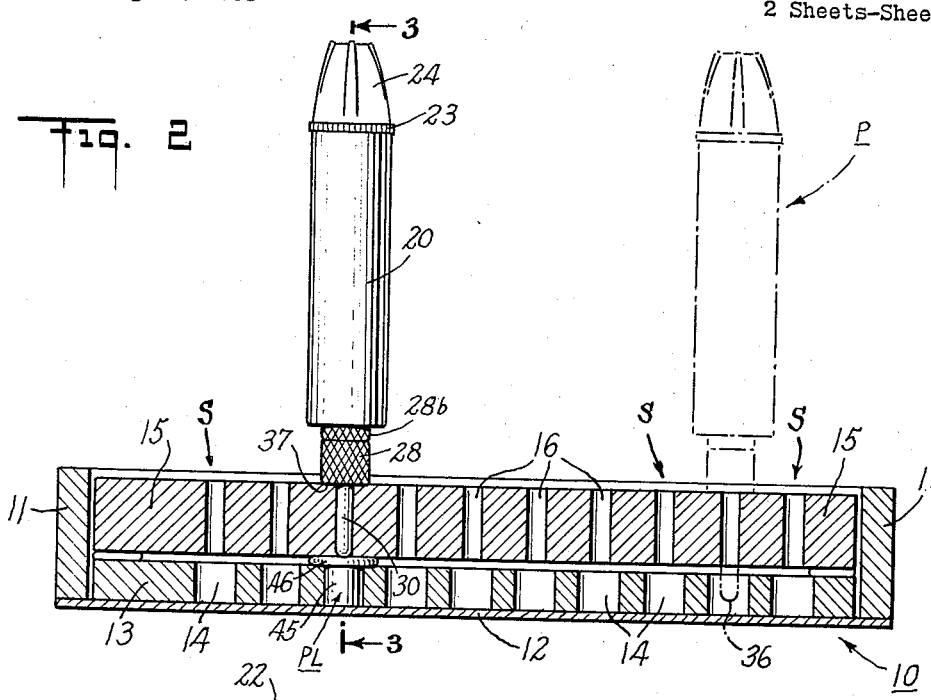
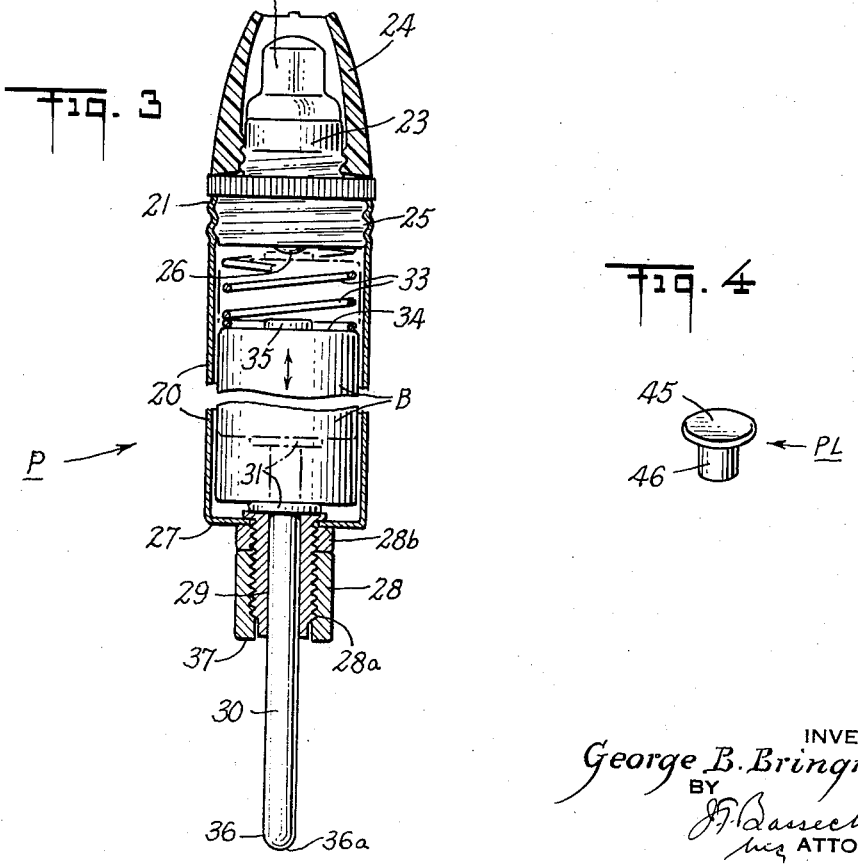
INVENTOR
George B. Bringmann
BY
ATTORNEY

United States Patent Office 2,889,634
Patented June 9, 1959

2,889,634
EDUCATIONAL GAME BOARD WITH SENSING PROBE

George B. Bringmann, Bronx, N.Y.

Application August 1, 1958, Serial No. 752,578

8 Claims. (Cl. 35—9)

This invention relates to an educational device; and more particularly, to an educational device having signal means.

This invention is a continuation-in-part of my application Serial No. 727,214, filed April 8, 1958.

Still more particularly, this invention relates to an educational device whereby a user or contestant may check the correctness or incorrectness of his answers to a predetermined group of questions by means of a signal which is selectively actuated upon instances of correct answers, and is not actuated upon instances of incorrect answers.

Known to me are educational devices in the form of quiz games in which multiple answers are suggested, and which include a complex wiring system and contacting probe so that a circuit may be closed upon the probe being brought into contact with one of a selected number of possible answers. Such constructions are costly and are limited in flexibility to a comparatively simple group of organized questions and answers, due to the increased complexity of wiring attendant upon extending the number of organized questions and answers.

A further factor tending to limit the popularity of such wired educational devices is the fact that such wiring frequently becomes disorganized in use, rendering the device entirely inoperative.

Known to me also are quiz games or question forms with multiple answer possibilities, making use of a self-contained flashing signal in combination with surface coatings having selective conductivity. Such devices, however, are not suitable for repeated use, particularly where the users are likely to subject the device to rather rough or vigorous treatment.

Accordingly, it is an object of this invention to provide an educational device in the nature of a game board in which a panel element, capable of carrying graphic representations, has formed thereon a plurality of sockets having mouth portions at one face of the panel, the socket members being formed to a depth sufficient to conceal the junction of the socket with the opposite face of the panel, the said panel including means whereby certain sockets may be blocked at an intermediate position by selectively positionable stops, said blocked sockets serving to cooperate with a depth sensing probe to signal correct answers when the said probe is inserted in the said blocked sockets.

More particularly, my invention resides in the provision of an electrical educational device including a panel provided with a multiplicity of sockets through which removably positioned components may be combined at an intermediate blocking position within the said sockets, said components being invisible at said intermediate position but yet being capable of differentiation from the unblocked sockets by means of a depth sensing probe insertible within the sockets, adapted to actuate a signal in the said probe upon insertion into blocked sockets, but not upon insertion into unblocked sockets.

Still more particularly, it is an object of my invention to provide a panel of multi-part construction, the parts forming the said panel each having sockets adapted to register with the partial sockets in the other part forming the panel, the said panel being adapted to receive a card at an intermediate position between the multi-parts forming the panel, which card is predeterminedly perforated and serves in the intermediate position between the said multi-part panel to block continuous passage between certain of the said sockets and to permit passage between other of the partial sockets.

Still more particularly, it is an object of my invention to provide an educational device or the like comprising a panel having a plurality of sockets, each of the said sockets representing possible answers to a question or questions, the contestant indicating his choice of a given answer by inserting a depth sensing probe into the socket corresponding to the desired answer, the said probe being arranged by means of a novel lighting and sensing assembly to give an electrical flashing signal when inserted into a socket corresponding to a correct answer, and giving no signal when inserted into a socket corresponding to an incorrect answer.

To attain these objects and such further objects as may appear herein or be hereinafter pointed out, I make reference to the accompanying drawing, forming a part hereof, in which—

Figure 1 is an exploded perspective view of my device;

Figure 2 is a magnified vertical section through my device, indicating the positions of a probe corresponding to correct and incorrect answering positions;

Figure 3 is a further magnified section taken on the lines 3—3 of Figure 2;

Figure 4 is a sectional view of a plug or stop in accordance with my invention.

I now make reference to the drawings wherein the panel member comprises a generally rectangular frame member 10, having side wall portions 11, elevated from a base portion 12. The first panel member 13, of a dimension snugly to fit within the space defined by walls 11, is provided with plural rows of perforations or partial sockets 14. An upper partial panel member 15, having an outer periphery likewise closely approximating the inner periphery defined by the walls 11, is provided with partial sockets 16 arranged in the superimposed position above the first partial panel member 13, to register with the larger perforations 14.

The sensing probe P intended to be used with my educational device comprises generally a housing 20, threaded at its upper end 21, to receive the conventional filamented bulb 22 in socket 23, and shield 24 surrounding the said bulb 22. The socket 23 is provided with a contacting portion 25 which is grounded to the case 20 and with another central contacting portion 26 which is substantially axially aligned and faced toward the bottom end 27 of the probe P. The probe P is provided, in addition, with a collar 28 having an inward guiding channel 29 arranged slidably to guide a headed stud portion 30 substantially along the axis of the housing 20. The stud 30 is provided with a headed portion 31 forming the upper end of the said stud and preventing escape in an outward direction of the stud through the end 27.

A conventional dry cell battery B is interposed between the head 31 of the stud 30 and a spring 33, which is biased at one end against the upper end 34 of the battery and at the other end against the socket 25. The upper central terminal 35, in the normal position of the battery, will lie axially beneath the central terminal 26 of the socket 25 but will normally lie spaced from the said terminal 25 under the influence of the spring 33.

It will be readily recognized that when the end 36 of the stud 30 is inwardly depressed, the headed portion 31 will be advanced axially inwardly in the direction of the position shown in dotted lines Fig. 3, thereby thrusting the upper terminal 35 of the battery B against the central terminal 26 of the socket 25, to complete the circuit, the other portion of which circuit is constantly closed and formed by contact of the headed portion 31 with the bottom of the battery, the headed portion 31 being, like the other terminal of the socket 25, continuously grounded to the case or housing 20.

As heretofore noted and as best seen from Figure 2, it is necessary in my device to provide means to block, at an intermediate depth, a predetermined number of socket means S, thereby rendering such predetermined socket means capable of actuating the bulb 22 upon insertion of the probe 36 within the said predetermined socket means.

I have herein illustrated two suggested methods of blocking the said sockets. In Figure 1, there is illustrated a blocking method particularly suitable for use with multiple choice type questions which require many "no" answers, as compared with the number of "yes" answers. For this purpose I provide a card 40, having an outside periphery arranged intimately to contact the space defined by the walls 11 of the frame 10, which card is provided with a plurality of punches or holes 41, arranged in the interposed position between the partial panel members 13 and 15 to register with the holes 14 and 16, respectively, of the partial panel members.

As will be seen from Figure 1, certain portions of the card have not been punched out, which portions will, in the interposed position of the card between the members 13 and 15, serve to block certain of the partial sockets 14 and 16 from communicating with each other. When the slidably mounted stud 36 of the probe 20 is inserted through a partial socket or hole 16 in the panel 15, it will normally pass through the hole 16 and the predetermined holes 41, and likewise the holes 14, without in any manner obstructing the slidable stud 36. In this position, the shoulder 37 will lie against the face of the panel 15 and prevent further inward movement of the probe 20. It will be seen that in such case, the bulb 22 will not be lighted.

However, when the stud 36 extending from the probe 20 is inserted through a hole 16 in the partial panel member 15, which is blocked by a solid portion in the perforated card 40, the said solid portion, when the shoulder 37 is forced against the upper face of the panel 15, will engage the stud 36 and thus move the battery B upwardly until the central terminal 35 of the battery contacts the central terminal 26 of the socket 25, thereby completing the circuit.

It will thus be recognized that each time the probe in the illustration of Figure 1 is inserted into an aperture 16 which is blocked by a portion of the card 40, the signal or bulb 22 will be lit, whereas each time the said stud 36 is inserted into a socket wherein the holes 41 of the card 40 register with the holes 14 and 16 of the panel members, the shoulder 37 of the collar 28 will lie against the upper face of the panel member 15, thereby preventing any further inward movement of the probe through the socket, thus disabling the signal from lighting. (An inserted probe in the unlighted position is shown in dotted lines, Figure 2.)

I have provided my device with a form of individually selective plug or stop means P1, as shown in Figure 4, thereby enabling my device to be used for playing the game known as "Battleship" where the contestants are provided with individual panels, below the surface of which panels various plugs (as shown in Figure 4) may be arranged, the problem being to outguess the opponent as to the location of the opponent's plugs before the opponent is able to guess the location of the other contestant's plugs.

As best seen from Figure 2, the plugs P1 comprise a headed portion 46 and an extended neck portion 45, the said neck portion being of a dimension frictionally to fit within the apertures 14 of the lower panel member 13. As best seen in Figure 2, the probe member shown in solid lines is illustrative of the position which will be occupied by the probe when inserted into a plugged or stopped hole, whereas the probe shown in dotted lines is illustrative of the position which will be occupied by the probe when inserted into an unblocked socket or hole.

As best seen in Figure 3, the probe may be provided with a threaded portion 28a, to which the collar 28 is adjustably secured whereby, by rotation of the said collar portion and complemental locking portion 28b, the depth of the shoulder 37 relative to the probe tip 36a, must be adjustably controlled.

It will be readily recognized that by numbering the horizontal and vertical rows of sockets or apertures on the front face of the panel member 15, an infinite variety of question and answer combinations may be arranged, there being supplied for each set of questions and answers a different perforated answer card 40. For each such card, there will normally be a key wherein the questions to be answered are listed and the multiple choices for such answers are also listed.

Numerous other forms of educational contests utilizing the principle of my invention will readily suggest themselves, the foregoing games being merely illustrative. Accordingly, my invention is to be construed broadly, within the scope of the appended claims.

As in my prior application, I may employ front face markers to indicate wrong and right answers where it is found desirable to make an attempt to tabulate wrong and right answers in a competitive use of the device.

Having thus described my invention and illustrated its use, what I claim as new and desire to secure by Letters Patent, is—

1. An electrical signal operating educational device comprising a panel member having a plurality of socket means, each having a mouth portion at the front face of said panel, said socket means being spacially extended to a depth effectively to conceal visually portions of the sockets which lie inwardly from the mouth portions, a predetermined plurality of said socket means including stop means positioned at an intermediate depth in said socket means, a sensing probe having a stop shoulder arranged to lie against the face of said panel and a stud portion normally extending outwardly beyond said shoulder and arranged to be movable inwardly relatively to said shoulder to activate signal means in said probe, said socket means not having said stop means being of a depth to permit said shoulder to contact said panel without depressing said stud and said predetermined plurality of said socket means being of a depth to move said stud portions inwardly when said shoulder contacts said face of said panel.

2. In an electric signal operating educational device including a sensing probe having signal means arranged to be activated by a predetermined inward movement of a normally outwardly extending stud portion relatively to a stop shoulder, a panel member having a plurality of socket means, each having a mouth portion at the front face of said panel member, said socket means being of a depth greater than the length of said extending stud portion and stop means arranged to be positioned in a predetermined plurality of said socket means, to lie at a depth from said face less than the length of said stud portion, whereby said signals will be activated when said stud portion is inserted in said socket means having said stop means, but not in said socket means not having said stop means.

3. A device in accordance with claim 1 wherein said panel comprises a plurality of layers and said stop means comprises a sheeted member arranged to be sandwiched between said layers, said sheeted member defining a plurality of cut out portions arranged in the sandwiched position of said member to register with all said socket means but said predetermined plurality of socket means.

4. A device in accordance with claim 3 wherein said layers and sheeted member have substantially identical peripheral dimensions, the combination including a plurality of wall members defining a guide space wherein said layers and member may be contained in said space, having inner peripheral dimensions substantially identical to the peripheral dimensions of said layers and sheeted member, to prevent relative shifting of the said layers and member.

5. A device in accordance with claim 2 wherein said panel comprises a plurality of layers and said stop means comprises a sheeted member arranged to be sandwiched between said layers, said sheeted member defining a plurality of cut out portions arranged in the sandwiched position of said member to register with all said socket means but said predetermined plurality of socket means.

6. A device in accordance with claim 1 wherein said stop means comprise plug members arranged to be inserted in said predetermined plurality of said socket means from the rear face of said panel.

7. A device in accordance with claim 2 wherein said stop means comprise plug members arranged to be inserted in said predetermined plurality of said socket means from the rear face of said panel.

8. For use with an educational device in accordance with claim 1 wherein said signal means comprises a flashlight case of the pencil light type having mounted in opposed position to said light means, an elongated, slidably mounted stud extending for a length in relation to its thickness effective visually to conceal the edge portion and a blocking shoulder through which the probe extends slidably to provide a depth sensing of the visually concealed aperture into which said stud may extend.

References Cited in the file of this patent

UNITED STATES PATENTS

| | | |
|---|---|---|
| 2,171,304 | Gelardin | Aug. 29, 1939 |
| 2,197,306 | Ingraham | Apr. 16, 1940 |
| 2,531,674 | Doumitt | Nov. 28, 1950 |
| 2,546,666 | Fleischer | Mar. 27, 1951 |